(12) United States Patent
Perez-Sanchez

(10) Patent No.: US 7,451,950 B2
(45) Date of Patent: Nov. 18, 2008

(54) JOINT FOR CONNECTING A LONGITUDINAL SIDE TO AN UPPER SIDE OF COMPONENTS AND FLEXIBLE STRIP FOR USE IN SUCH A JOINT

(75) Inventor: Juan Perez-Sanchez, Bad Aibling (DE)

(73) Assignee: Airbus Deutschland GmbH, Hamburg (DE)

( * ) Notice: Subject to any disclaimer, the term of this patent is extended or adjusted under 35 U.S.C. 154(b) by 69 days.

(21) Appl. No.: 10/502,559

(22) PCT Filed: Jan. 20, 2003

(86) PCT No.: PCT/DE03/00143

§ 371 (c)(1),
(2), (4) Date: Mar. 2, 2005

(87) PCT Pub. No.: WO03/062053

PCT Pub. Date: Jul. 31, 2003

(65) Prior Publication Data

US 2005/0175406 A1 Aug. 11, 2005

(30) Foreign Application Priority Data

Jan. 22, 2002 (DE) ................ 102 02 440

(51) Int. Cl.
*B64C 3/44* (2006.01)
*E05D 1/00* (2006.01)
*F16D 3/00* (2006.01)

(52) U.S. Cl. .................. 244/219; 16/225; 16/227; 403/179

(58) Field of Classification Search .............. 403/179; 16/225–227; 244/99.8, 212–219, 119, 123.8, 244/124, 131
See application file for complete search history.

(56) References Cited

U.S. PATENT DOCUMENTS

| | | | | |
|---|---|---|---|---|
| 661,346 A | * | 11/1900 | Lincoln | 16/227 |
| 2,219,524 A | * | 10/1940 | Lindley et al. | 16/225 |
| RE28,672 E | * | 1/1976 | Wakeman | 16/227 |
| 3,935,615 A | * | 2/1976 | Wakeman | 16/227 |
| 4,349,169 A | | 9/1982 | McAnally | |
| 4,843,679 A | | 7/1989 | Maidment et al. | |
| 5,019,007 A | | 5/1991 | Miller | |
| 5,048,585 A | * | 9/1991 | Miller | 16/227 |
| 5,158,388 A | | 10/1992 | Ruf | |

(Continued)

FOREIGN PATENT DOCUMENTS

DE 23 09 567 8/1974

(Continued)

*Primary Examiner*—Victor MacArthur
(74) *Attorney, Agent, or Firm*—W. F. Fasse; W. G. Fasse

(57) ABSTRACT

A joint arrangement connects a longitudinal edge of a first component with an upper surface of a second component. At least two cooperating bands are secured with their first ends respectively on opposite sides of the first component, and are secured with their second ends respectively on clamping elements arranged on the second component, so that the bands intersect the major center plane of the first component in the joint area between the components. A pressure element is positioned on at least one clamping element for supporting the first component, and the bands extend laterally next to the pressure element and crosswise relative to one another.

22 Claims, 7 Drawing Sheets

U.S. PATENT DOCUMENTS

| | | |
|---|---|---|
| 5,350,614 A | 9/1994 | Chase et al. |
| 5,354,589 A | 10/1994 | Wass |
| 5,463,794 A * | 11/1995 | Erland .................. 16/225 |
| 5,622,336 A | 4/1997 | Chavanne et al. |
| 5,945,053 A | 8/1999 | Hettinga |
| 6,010,098 A | 1/2000 | Campanile et al. |
| 6,315,095 B1 | 11/2001 | Garfinkle |
| 6,474,945 B1 | 11/2002 | Nakasato et al. |
| 2005/0175399 A1 | 8/2005 | Perez-Sanchez |

FOREIGN PATENT DOCUMENTS

| | | |
|---|---|---|
| DE | 28 07 648 | 9/1978 |
| DE | 40 37 774 | 4/1992 |
| EP | 0 860 355 | 8/1998 |
| EP | 1 085 152 | 3/2001 |
| GB | 2 184 281 | 6/1987 |
| RU | 2 081 788 | 6/1997 |

* cited by examiner

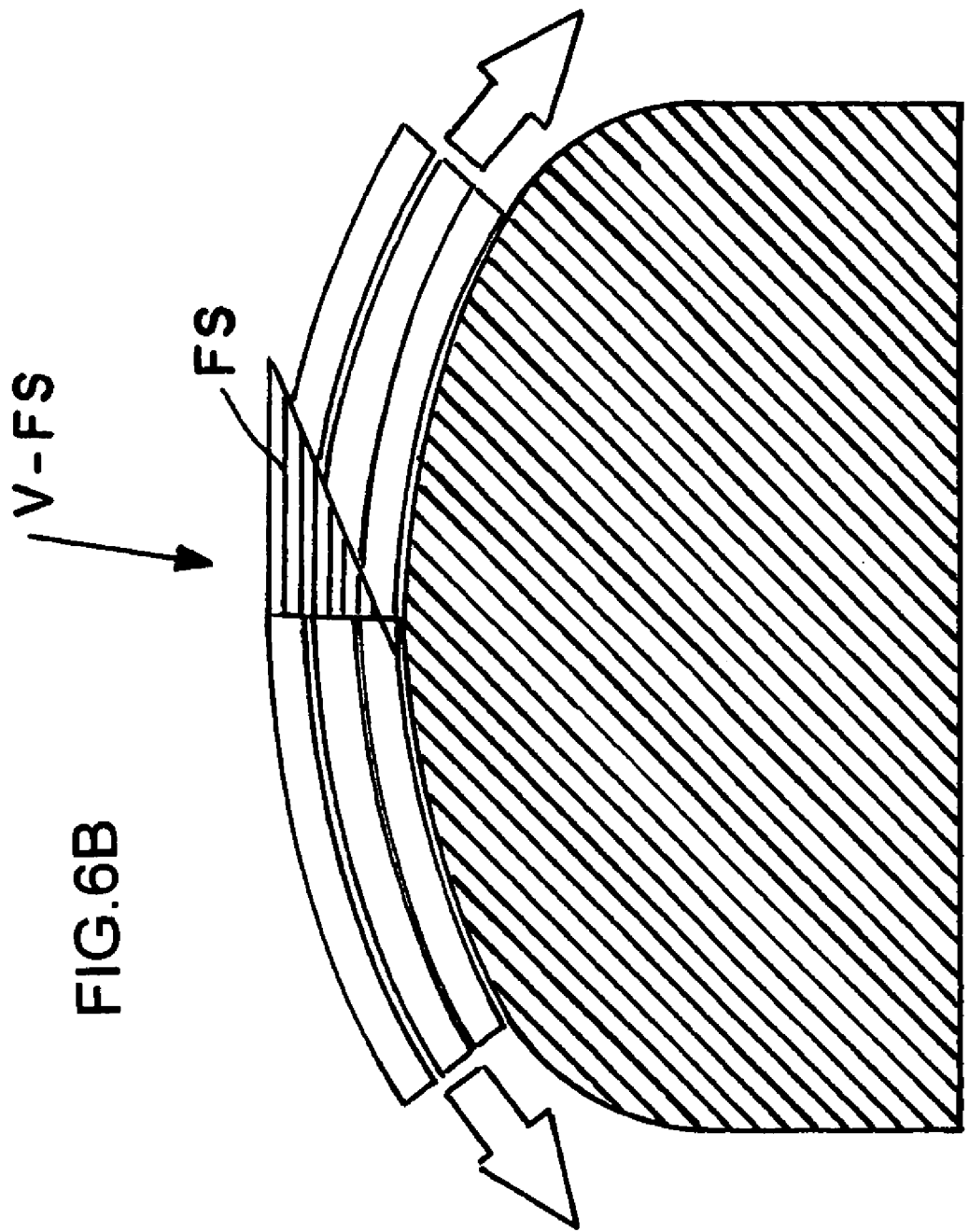

JOINT FOR CONNECTING A LONGITUDINAL SIDE TO AN UPPER SIDE OF COMPONENTS AND FLEXIBLE STRIP FOR USE IN SUCH A JOINT

FIELD OF THE INVENTION

The invention relates to a joint for a component-arrangement, in which a longitudinal side of a first component faces toward an upper surface of a second component, as well as a flexible band for use for such a joint.

For improving the aerodynamic characteristics of wings, concepts for a wing with a variable profile that is adjustable via control mechanisms are known from the general state of the art. These concepts, however, use relatively many movable parts and joints, which mean a high effort and expense with respect to their fabrication and assembly.

For example, the U.S. Pat. No. 4,349,169 discloses a lifting wing with a profile that is variable by means of an actuator drive. Drive rods of the actuator drive are connected by means of joints with the structure of the lifting wing, whereby the axial direction of the joints extends in the span direction. Thereby, a profile variation is indeed possible, if plural actuator drives with corresponding operating rods are arranged one behind another as seen in the span direction. The profile shape variation disclosed therein, however, is achieved over the entire span direction in this arrangement.

Furthermore, from the EP 860 355, there is disclosed an aerodynamic component with variable camber, which is formed of articulately supported ribs with an outer belt and several stiffening struts that have a constant length and that engage on this outer belt. For deforming the component, the stiffening struts are operated by actuators in such a manner so that the stiffening struts move in the rib longitudinal direction or flow direction.

From the DE 28 07 648 C2, a foldable wall is known, with wall parts connected with one another through a fabric joint. The fabric joint is a band that is provided with a rim or edge rib on its longitudinal edges. The edge rib is held in a groove extending longitudinally along the side face of the wall part with a corresponding recess that is wider relative to the groove.

SUMMARY OF THE INVENTION

The object of the invention is to provide a joint that is simply constructed and simply installable, and represents an alternative to the presently utilized joints.

This object is achieved with the characterizing features of the independent patent claims. Further embodiments are set forth in the dependent claims.

According to the invention there is provided a joint for the connection of a longitudinal side of a first component with an upper surface of a second component with at least two cooperating bands, which are secured with their first ends E1 respectively on different sides lying opposite one another of the first component, and which are secured with their second ends E2 on respectively one clamping element arranged on the second component in such a manner, so that these intersect the longitudinal center axis of the first component in opposite directions in the area between the components, with a pressure element for supporting the first component positioned on at least one clamping element, whereby the bands extend laterally next to the pressure element and crosswise or transversely relative to one another as seen in the axial direction. The bands can be formed of at least two plies of a fiber-reinforced composite material or a different synthetic plastic or a textile material. The bands can extend in their longitudinal direction at an angle β relative to the axial direction of the structure-joint, whereby the angle β amounts to not equal to 90 degrees for taking up the shear forces to be transmitted through the joint. The bands can be secured between a clamping element and the second component.

BRIEF DESCRIPTION OF THE DRAWINGS

In the following, the invention is described in connection with the accompanying figures. It is shown by:

FIG. 6b a schematic illustration of the shear force course or path in the use of a flexible band for a joint, which is fixed in a matrix, thus for example in a resin layer.

DETAILED DESCRIPTION OF EXAMPLE EMBODIMENTS OF THE INVENTION

Flexible joint-bands or bands or flexible straps or belt elements that are constructed of at least two layers or plies of a material, whereby the layers or plies are not fixed with one another in the free joint area FG, are used for the inventive joints for the jointed or articulated connection of two components that are movable relative to one another. In the following, that area or region that lies between the components that are connected with one another, is understood as the free joint region or area FG. The free joint area FG is also that area of the bands, at which the bands of the joint do not lie in contact on the components in each of the prescribed positions thereof. In contrast, each flexible band provided according to the invention comprises a fixed area or region B, at which the band is secured to the respective component or is fixedly connected therewith. Areas or regions can also be included on these bands, which indeed lie in contact on the component or the components, but which are not fixed or secured thereto.

The inventive joint is a structure-joint, because it can be formed, in its sub-parts, of materials that comprise similar characteristics as the components that are connected with this, so that the behavior of the joint corresponds to the behavior of the components even under the influence of forces or under tensions or stresses.

Figure 6A:
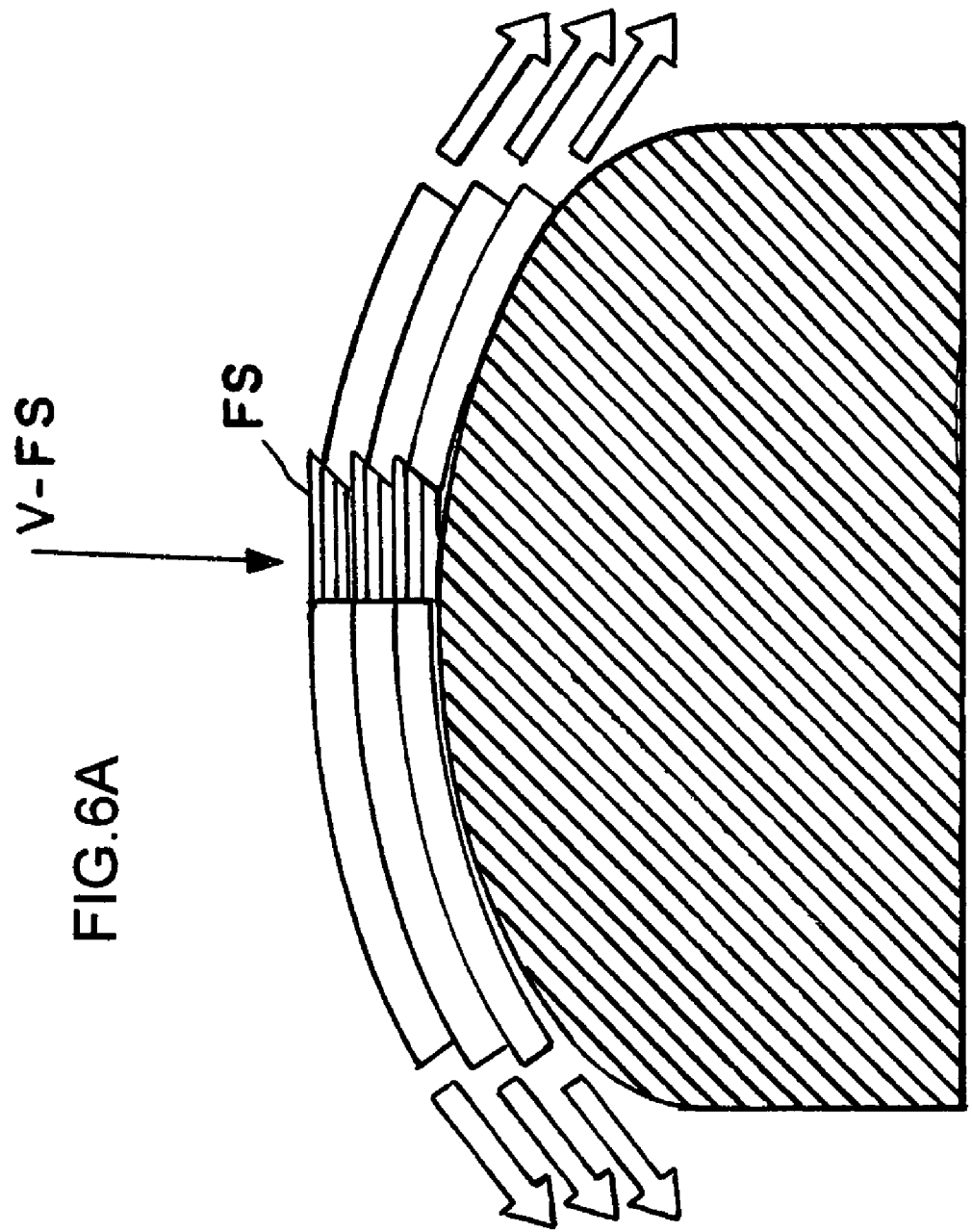
FIG. 6a a schematic illustration of the shear force course or path in the use of a flexible band for a joint, which, according to the invention, is not fixed, but rather formed as a woven web, for example.

A fiber-reinforced composite (FRC) material or a different synthetic plastic or a textile material or woven web is especially provided as the material for the bands used according to the invention. The provided bands are formed of at least two plies of the above referenced material. The plies are not fixed to one another in the area FG, thus in the region between the components T3, T4 that are to be connected with the joint, in order to keep the shear forces FS of the arising shear force path or course V-FS as small as possible (FIG. 6a). Otherwise, a disadvantageous course or path of shear forces FS would arise (FIG. 6b).

In the FIGS. 1 to 5 there is an inventive structure-joint or an inventive structure-joint arrangement for the connection of at least two components T3 and T4, which are shown in a neutral position. In this position, the components form a T-arrangement. Fundamentally, the components can form an angled arrangement in their neutral position. The joint connection shown in the FIGS. 1 to 5 serves for the connection of a longitudinal side of a first component T4 with an upper surface of a second component T3. The joint arrangement further includes at least one pressure element arranged between the longitudinal side and the upper surface for forming a free joint area FG, and two flexible bands cooperating therewith.

According to the invention, there is provided a joint connection for the connection of a longitudinal side of a first component T4 with an upper surface of a second component T3 with at least two cooperating bands, which are secured with their first ends E1 respectively on different sides lying opposite one another of the first component T4, and which are secured with their second ends E2 on respectively one clamping element arranged on the second component T3 in such a manner, so that the paths thereof in relation to a longitudinal center axis A of the first component T4 extend opposite one another or these intersect the longitudinal center axis A of the first component in opposite directions in the area between the components, with a pressure element positioned on at least one clamping element for supporting the first component T4, whereby the bands extend crosswise or transversely relative to one another as seen in the axial direction R1 and laterally next to the pressure element. Especially, the components, in interaction with the at least one pressure element, form, laterally adjacent thereto, a free joint area FG or two free joint areas, in which the bands respectively extend from one to the other component. Thereby, the bands can be arranged on one side of the pressure element or respectively one on both sides thereof. Preferably, two pressure elements are provided, in order to achieve a stable support of the pertinent component T4.

The bands can extend in their longitudinal direction at an angle β relative to the axial direction R1 of the structure-joint, whereby the angle β can especially amount to not equal to 90 degrees for taking up shear forces to be transmitted through the joint.

Figure 1:
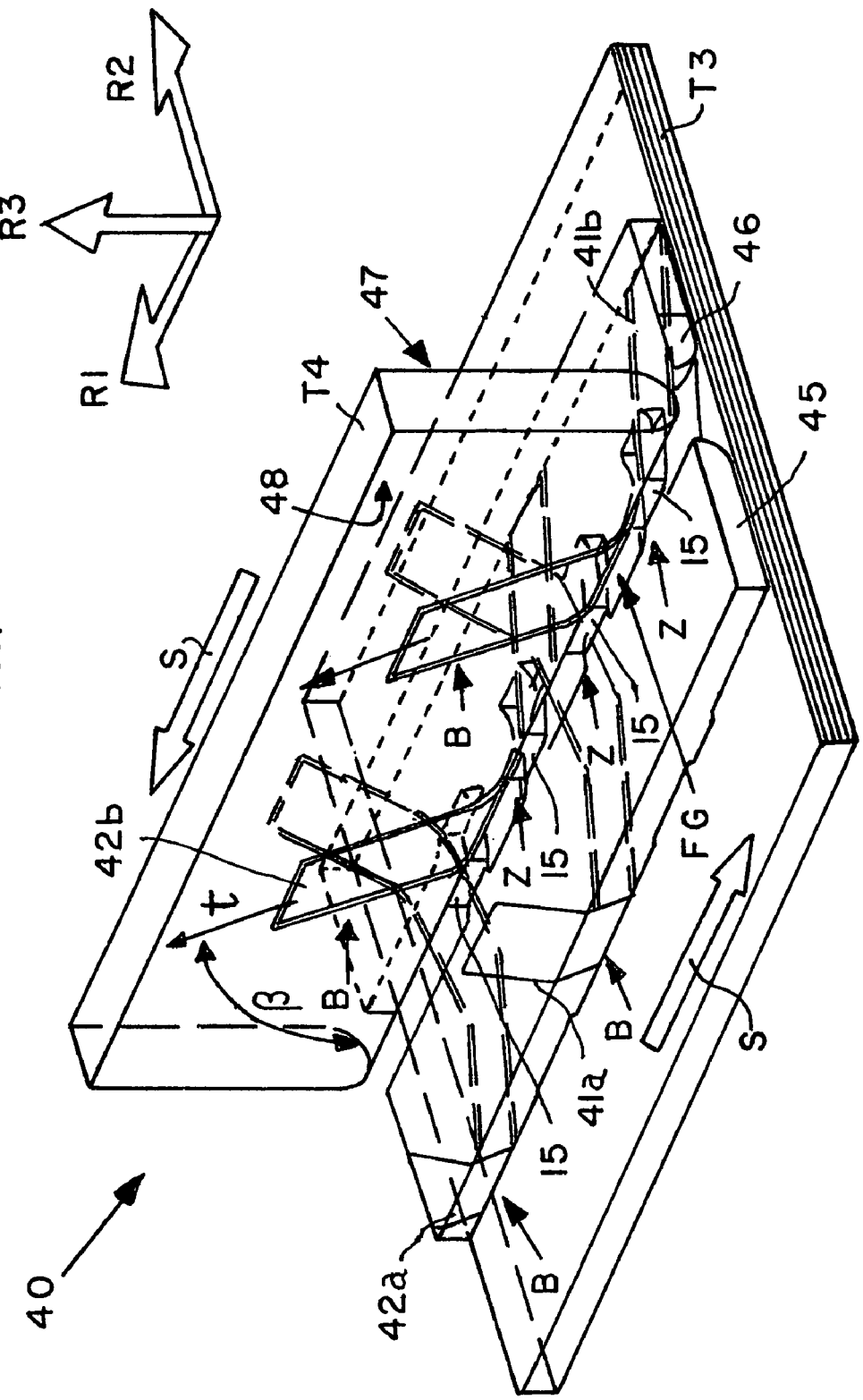
FIG. 1 a schematic perspective illustration of an embodiment of the inventive joint, in which the kinetics and kinematics are entered in an arrow representation.

The joint or joint arrangement 40 shown in FIG. 1 as a schematic principle illustration, comprises two arrangements with respectively two flexible bands 41a, 41b or respectively 42a, 42b as well as a total of three pressure elements 15, whereby one pressure element is located between the two arrangements of bands and respectively one pressure element is located laterally next to the two arrangements of bands. Two clamping elements 45, 46 in the form of clamping plates are arranged on the component T3, whereby one clamping element 45 or 46 is positioned on each side of the component T4.

Figure 2:
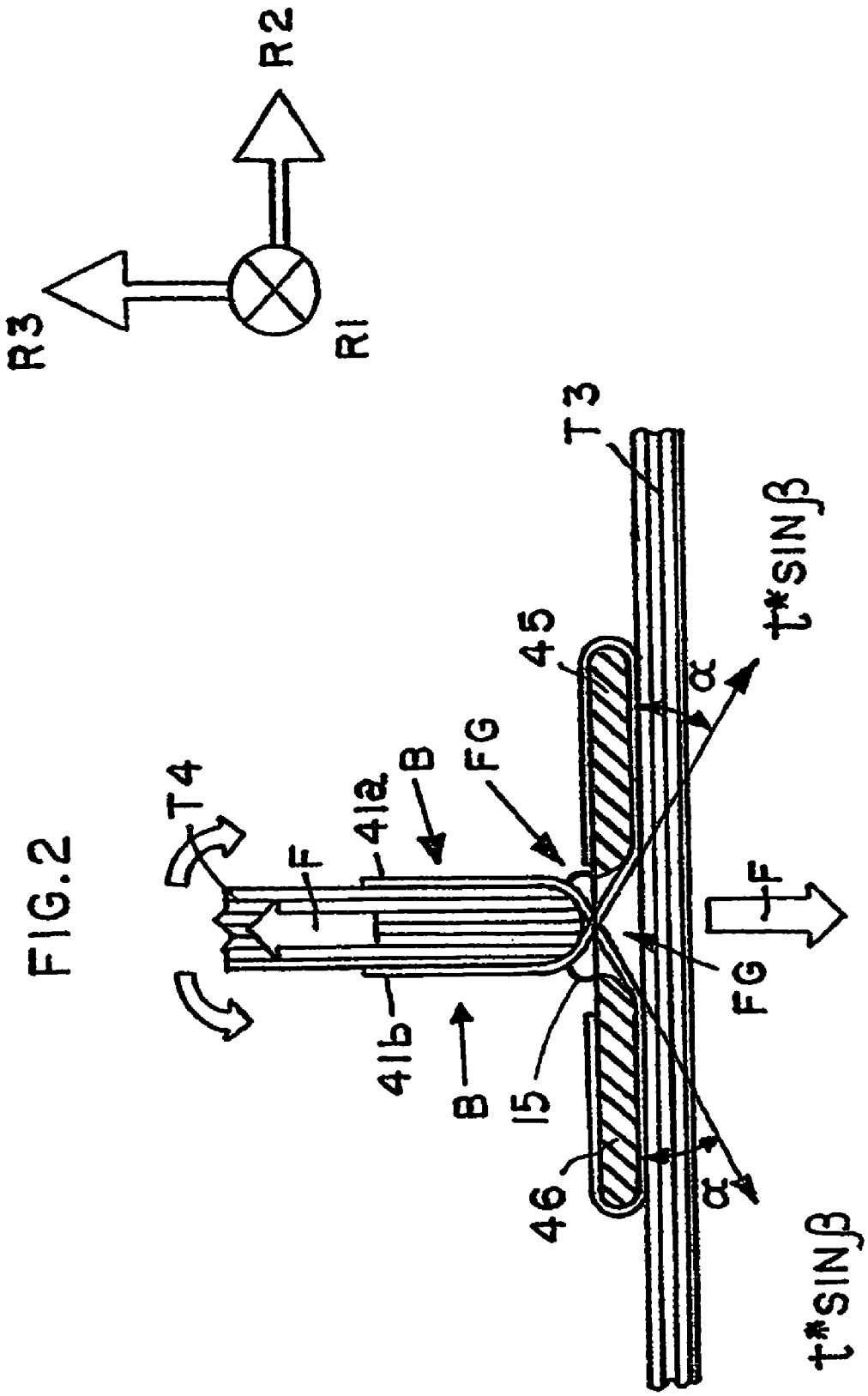
FIG. 2 the embodiment of the joint according to the FIG. 1 in section, with an arrow representation of the kinetics and kinematics.

The extension or path of the bands is as follows in the illustrated example embodiment: Each flexible band 41a, 41b or 42a, 42b extends from a first side of the component T4—for example the side 47—into the area between the component T3 and the clamping element that lies next to the component T4, and particularly on the side lying opposite to the first side of the component T4—thus in the example next to the side 48. From there, the flexible band extends around along the side of the clamping element 45 facing away from the component T4, onto the free side of the clamping element facing away from the component T3, where the band is preferably secured. To each flexible band, at least one further flexible band is arranged, which is laid from the component T4 around the clamping element opposite the described path. The kinematics in this arrangement dependent on the angles α and β are illustrated in FIGS. 1 and 2. The angle α is the angle spanned by each respective one of the bands 41a, 41b in the free joint area FG in relation to the upper surface of the component T3.

Particularly, the abovementioned relationships are given by $p = t * \sin\beta$
$S = \Sigma t * \cos\beta$
$F = \Sigma t * \sin\alpha * \sin\beta$ wherein
  p=pressure effective on the pressure elements
  t=tension effective in the bands
  S=external shear forces in axial direction R1
  F=external tension forces in thickness direction R3
  β=angle of bands relative to axial direction R1
  α=angle of bands through free joint area relative to transverse direction R2

Figure 3:
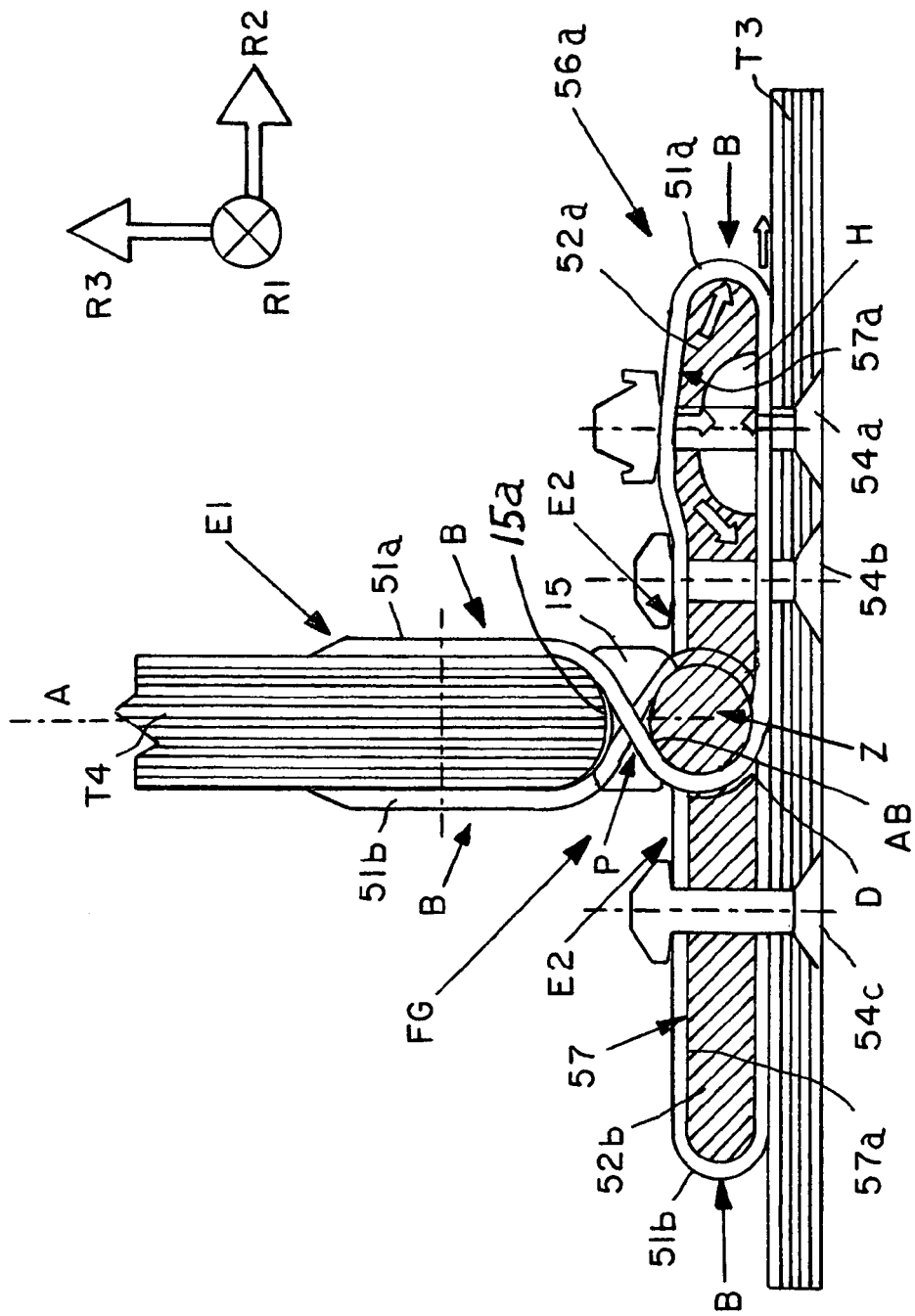
FIG. 3 a further embodiment as a variant A of the inventive joint.
Figure 4:
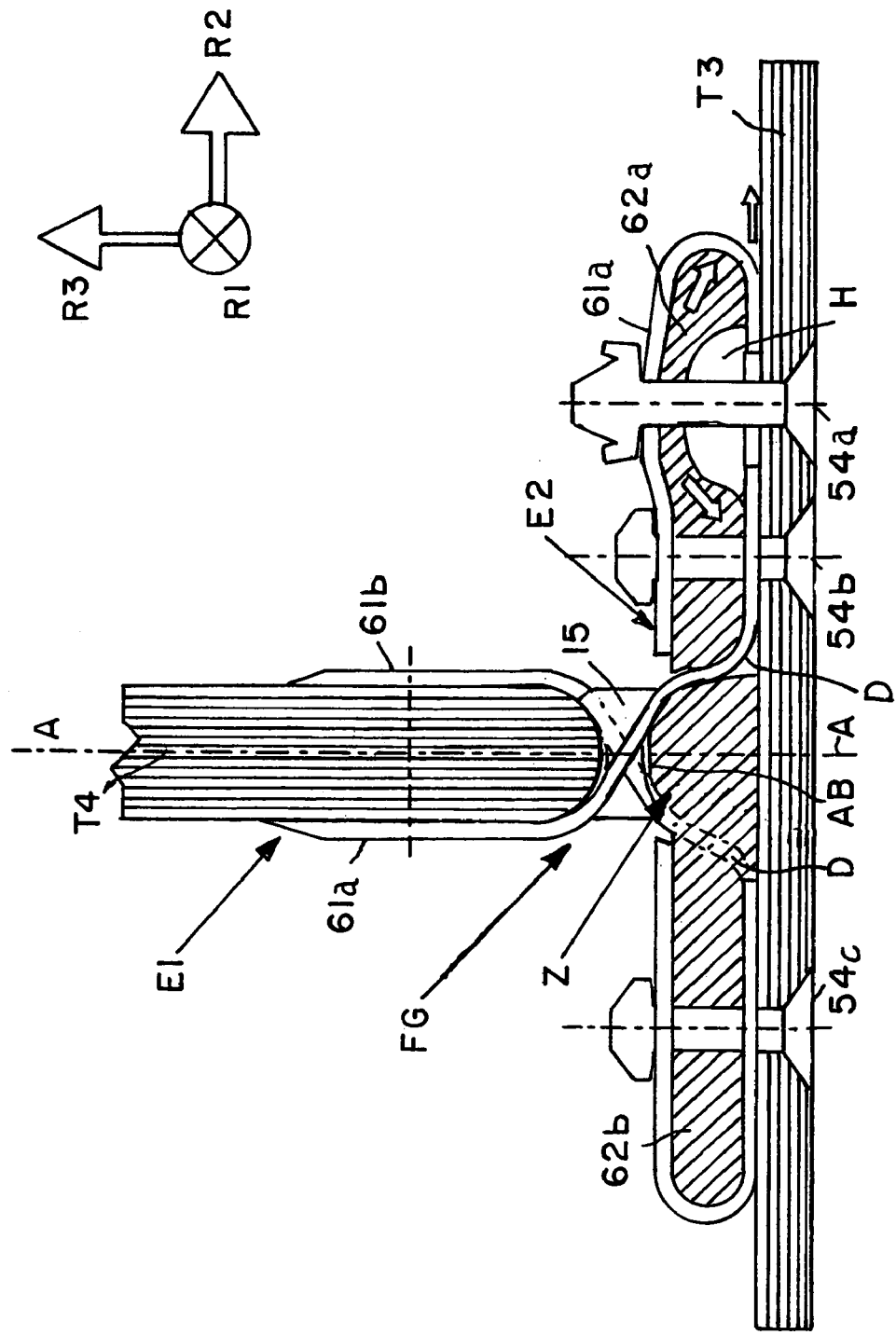
FIG. 4 a further embodiment as a variant B of the inventive joint.
Figure 5:
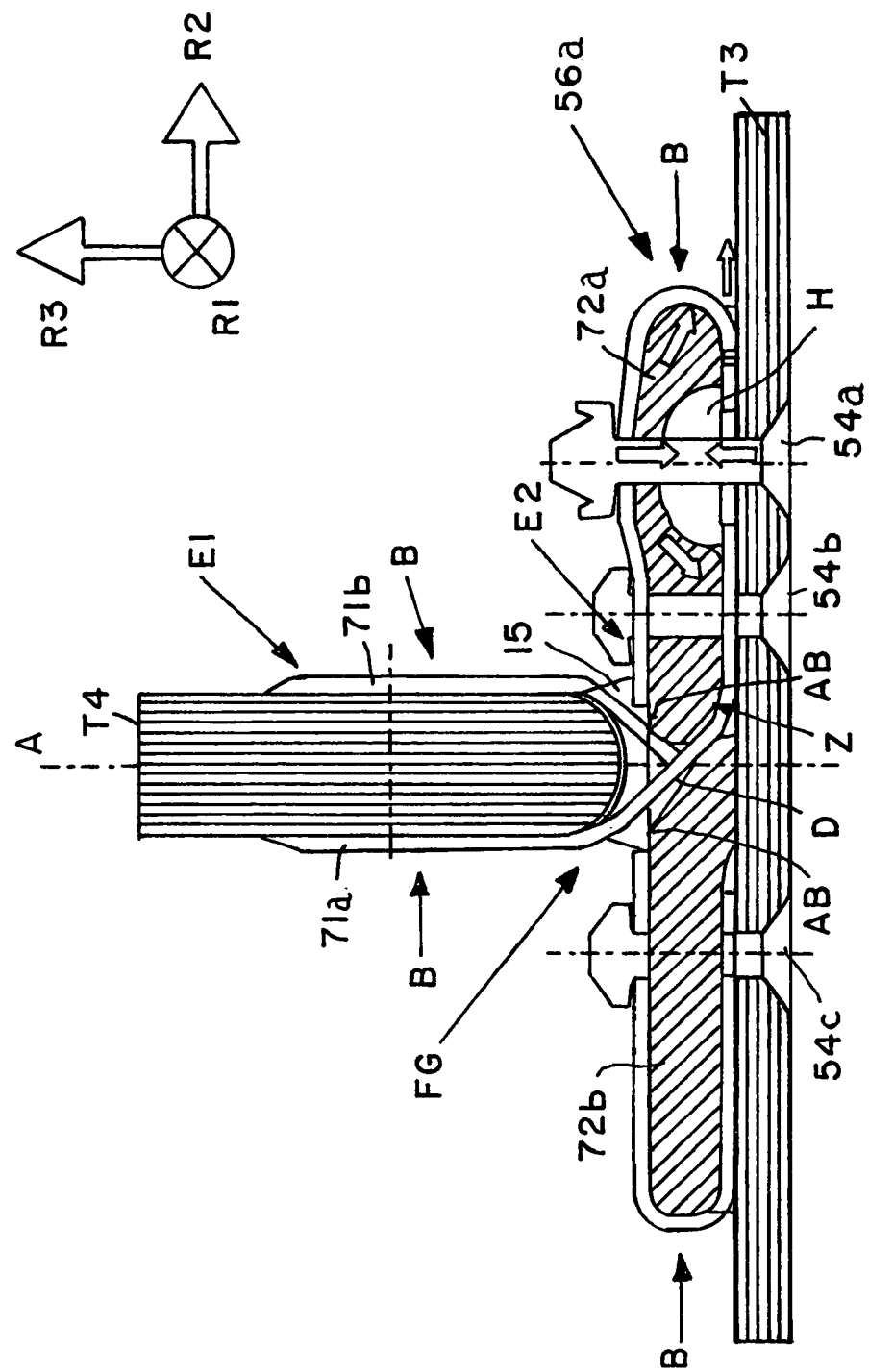
FIG. 5 a further embodiment as a variant C of the inventive joint.

Various different alternatives for the course or path of the bands and the positions of the clamping elements relative to the component T4 are illustrated in the FIGS. 3 to 5, whereby respectively only two bands are shown. Fundamentally, two or more than two bands can be used for the inventive joint. The description of the path thereof is described essentially in connection with one of the two illustrated bands. The course or path of the at least one further band results correspondingly, in order to achieve a force flux opposite one another arising in the bands—as it is shown in the FIG. 2.

The respectively illustrated component T4 is oriented in its neutral position with its crosswise or transverse planar direction R3 angularly on the upper surface of the component T3. In FIGS. 3 to 5, as an example, an angle of 90 degrees is illustrated for this neutral position. Thereby, a first band 51a is guided around a first clamping element 52a and a second band 51b is guided around a second clamping element 52b as seen from the component T4, whereby the bands lie one behind another as seen in the axial direction R1 of the joint or in the corresponding longitudinal direction of the components in the free joint area FG, and the bands' longitudinal directions run crossed-over one another. According to the invention, at least two cooperating bands are used, which are secured with their first ends E1 respectively on different sides lying opposite one another of the first component T4, and which are respectively secured on a clamping element arranged on a second component T3, whereby the positions of the clamping elements allow a securing of the bands on sides that are opposite one another in relation to a center axis A of the first component T4. Thus, according to the invention, the paths of at least two bands are opposite one another in relation to a longitudinal center axis of the first component T4.

The clamping elements, together with the bands, are preferably secured by means of connection elements on the component T3. A pressure element 15 is arranged in such a manner on one clamping element or on both clamping elements (FIG. 5) so that the component T4 is supported in its provided joint positions on a corresponding bearing support surface 15a of the pressure element 15. For that purpose, one or both clamping elements can respectively comprise a tongue Z or a contact area AB for receiving a pressure element 15. A contact area AB can be arranged on a tongue Z. The tongue Z of a clamping element protrudes into the area between the second component T3 and the side surface of the first component T4 facing toward this component T3. The tongues, lying one behind another in the axial direction R2, of clamping elements successively following one another in this direction, overlap one another. Since the bands contact or lie on these facing surfaces of the tongues Z, the bands are guided in such a manner, so that bands lying respectively next to one another as seen in the axial direction R1 cross one another in the free joint area FG (see FIGS. 3 to 5).

The two flexible bands 51a, 51b secured on the component T4 are used in the embodiment according to the FIG. 3. Both clamping elements protrude with their cross-sections so far into the extension of the component T4 in its crosswise or transverse planar direction R3, so that the bands beginning from the component T4 extend transversely relative to one another and positioned next to one another in the free joint area FG. A fictitious intersection point P of the bands arises as seen in the longitudinal direction of the components T3, T4. This point P is the turning or pivot point of the joint.

The respective band, beginning from the component T4, after extending through the free joint area FG, can be guided between the component T3 and either the first clamping element 52a or the second clamping element 52b, respectively, in order to then be secured on the free upper surface of the pertinent clamping element 52a or 52b respectively. Beginning from one side of the component T4, each band runs or extends through the free joint area FG up to the component T3, and crosses the longitudinal center axis A of the component T4 while extending through the free joint area FG. From there, the band extends around the cross-section of one clamping element, and in fact at first through between the two clamping elements, and then at least partially into the area between one of the clamping elements and the component T3, and preferably around the free outer side of the same clamping element up to a prescribed portion of the free outer side of the same clamping element.

Each band is guided through an area that is kept free or clear of the two clamping elements to form a passage D. The position of this kept-free or clear area is positioned either in the area of the cross-section of the extension of the component T4 in the direction toward the component T3 (FIG. 5) or laterally next to this area (FIGS. 3 and 4). This area D is, however, positioned in such a manner so that the pertinent band can be guided from one side of the component T4 to the other side thereof over the center axis A of the component T4 on the pivot point P in the free joint area FG. From there, either this band extends in the direction in which it crosses the center axis A, to a clamping element (FIGS. 2, 4 and 5), where it is secured between this clamping element and the component T3, or alternatively the band is secured between a clamping element and the component T3, on the same side in relation to the center axis A on which it is secured on the component T4 (FIG. 3).

The securing of the pertinent band on its first end E1 on the component T4 is carried out in various different ways according to the state of the art. The band can be adhesively bonded or secured by means of connection elements on the component T4.

The fixing or securing of the bands on the component T3 can be achieved according to the state of the art, thus for example through adhesive bonding, through securing elements, or through a melting fusion of the materials of the respective band with the respective component.

Preferably, the securing of the bands on their second end E2 on the respective clamping element is achieved by means of connection elements. In the FIGS. 3 to 5 it is shown on a first clamping element by means of at least one connection element 54a, that extends perpendicularly to the component T3 and to the first clamping element 52a, or 62a or 72a, and that extends through the component T3, through the first clamping element 52a or 62a or 72a and the section of the band positioned therebetween. Preferably, the pertinent band is guided around the rim or edge side 56a of the clamping element 52a or 62a or 72a facing away from the component T4 onto outer side 57a lying opposite to the component T3. The first connection element 54a thus extends through an area of the flexible band positioned between the first clamping element 52a or 62a or 72a and the component T3, as well as an area of the band positioned on the outer side 57a of the clamping element 52a or 62a or 72a. For that purpose, a corresponding bored hole for receiving the first connection element 54a is arranged in the first clamping element 52a or 62a or 72a.

Preferably, a hollow space H is provided in the first clamping element 52a or 62a or 72a, through which the first connection element 54a extends. The hollow space H is advantageously open to the component T3. Through the hollow space H, during tightening of the first connection element 54a, the first clamping element 52a or 62a or 72a is lengthened or stretched in the transverse direction R2 of the clamping element, thus in the longitudinal direction of the band, in order to stress or tension the pertinent band.

Advantageously, a second connection element 54b is provided close to the free joint area FG or close to the component T4. This second connection element 54b extends—like the first connection element 54a—through the component T3, through an area of the flexible band positioned between the first clamping element 52a or 62a or 72a and the component T3, through the first clamping element as well as through an area of the band positioned on the outer side 57a of the clamping element. A corresponding bored hole is arranged in the first clamping element 52a or 62a or 72a for receiving the second connection element 54b.

The second clamping element 52b or 62b or 72b is secured on the component T3 by means of a further connection element 54c. The position of the second clamping element is provided relative to the first clamping element 52a or 62a or 72a so that the flexible band can be guided between these. The second clamping element 52b or 62b or 72b can additionally be provided for securing a further flexible band 51b or 61b or 71b of the same joint. Thereby, the course or path thereof is then opposite in relation to the center axis A and preferably symmetrical to the course or path of the band secured on the first clamping element.

At least two flexible bands extending oppositely in relation to a center axis A of the component T4 are arranged according to the invention, whereby the at least two bands are secured on at least two clamping elements extending transversely to the longitudinal direction of the components T3, T4. Also more than two, thus for example four clamping elements can be used for the securing of the at least two bands. These are then arranged offset relative to one another in a manner transversely to the longitudinal direction R1 of the components T3, T4 in such a manner, so that the flexible bands can be laid around the contact surfaces of the respective clamping elements while lying next to one another and extending crossed-over in the free joint area FG.

An alternative course or path of a flexible band 61a according to the invention is illustrated in the FIG. 4. The flexible band 61a is secured on a first clamping element 62a, which is arranged on the opposite side in relation to the center axis A of the component T4. For that purpose, the second clamping element 62b protrudes correspondingly far into the extension of the cross-section of the component T4 in the direction toward the component T3, in order to form the intersection point of the corresponding extensions of the bands 61a, 61b in the component longitudinal direction R1, which is preferably the pivot point P of the components.

In the embodiment of FIG. 5 with the bands 71a, 71b, the clamping elements 72a, 72b are arranged in such a manner so that the passage D formed thereby is positioned in the area of the extension of the cross-section of the component T4 to the component T3.

A contact element can be arranged according to the invention on the side of the pressure element 15 facing toward the first component T4. This contact element can comprise a sliding layer, that is positioned on the bearing support surface 15a of the pressure element that faces toward the first component T4. Furthermore, the side or surface of the contact element facing toward the first component T4 can comprise a larger radius of curvature than the surface of the first component T4 facing this surface, in order to reduce arising compressive stresses.

The invention claimed is:

1. Joint arrangement comprising:
a first component having a longitudinal side;
a second component having an upper surface;
two clamping elements;
at least two cooperating bands (41a, 41b; 42a, 42b; 51a; 51b; 61a, 61b; 71a, 71b), which are secured with first ends (E1) thereof respectively on opposite sides of the first component (T4), and which are secured with second ends (E2) thereof on respectively one of the clamping elements (45, 46; 52a, 52b; 62a, 62b; 72a, 72b) arranged on the second component (T3), in such a manner so that the bands intersect a longitudinal center axis (A) of the first component (T4) in opposite directions in a joint area between the components;
a pressure element (15) positioned on at least one of the clamping elements for supporting the first component (T4); and
a respective connection element that secures a respective one of the bands and a respective one of the clamping elements;
wherein the bands extend laterally next to the pressure element and crosswise relative to one another as seen in an axial direction (R1), and wherein the bands (41a, 41b; 42a, 42b; 51a; 51b; 61a, 61b; 71a, 71b) are secured between respectively one of the clamping elements (45, 46; 52a, 52b; 62a, 62b; 72a, 72b) and the second component; and
wherein the bands (41a, 41b; 42a, 42b; 51a; 51b; 61a, 61b; 71a, 71b) are respectively guided through an area between one of the clamping elements (45, 46; 52a, 52b; 62a, 62b; 72a, 72b) and the second component up to an upper surface of the clamping element positioned opposite this area, and the bands are respectively secured by the connection element (54a, 54c), that protrudes through the second component, the respective clamping element, and an area of the respective band positioned between the respective clamping element and the second component as well as an area of the respective band on the respective clamping element.

2. Joint arrangement according to claim 1, characterized in that the bands (41a, 41b; 42a, 42b; 51a; 51b; 61a, 61b; 71a, 71b) are formed of at least two plies of a fiber-reinforced composite material or a synthetic plastic or a textile material.

3. Joint arrangement according to claim 1, characterized in that the bands (41a, 41b; 42a, 42b; 51a; 51b; 61a, 61b; 71a, 71b) each extend in a longitudinal direction thereof at an angle β relative to the axial direction, whereby the angle β amounts to not equal to 90 degrees for taking up shear forces to be transmitted through the joint arrangement.

4. Joint arrangement according to claim 1, characterized in that the respective clamping element comprises a hollow space (H) that is deformable by the respective connection element in order to change an extension dimension of the respective clamping element extending in a longitudinal direction of the respective band for tensioning the band.

5. Joint arrangement according to claim 1, characterized in that the bands (41a, 41b; 42a, 42b; 51a; 51b; 61a, 61b; 71a, 71b) are arranged one behind another as seen in the axial direction.

6. Joint arrangement according to claim 1, further comprising a contact element that is arranged on a side of the pressure element (15) facing toward the first component (T4).

7. Joint arrangement according to claim 6, characterized in that the contact element comprises a sliding layer, which is positioned on a surface of the pressure element that faces toward the first component (T4).

8. Joint arrangement according to claim 6, characterized in that the side of the contact element facing toward the first component (T4) comprises a larger radius of curvature than the surface of the first component (T4) facing toward this side, in order to reduce arising compressive stresses.

9. A joint arrangement comprising:
a first component and a second component, wherein said first component is arranged with a longitudinal edge thereof adjacent to and running in a longitudinal direction along a major surface of said second component, and wherein a joint area is formed between said longitudinal edge of said first component and said major surface of said second component;
a pressure element that is arranged in said joint area between said longitudinal edge of said first component and said major surface of said second component, and that is adapted to support said first component relative to said second component;
a first clamping element and a second clamping element that are respectively secured on said major surface of said second component;
a first band that has a first portion thereof secured on a first side of said first component and has a second portion thereof secured between said first clamping element and said second component;
a second band that has a first portion thereof secured on a second side of said first component opposite said first side, and has a second portion thereof secured between said second clamping element and said second component; and
securing elements that secure said bands and said clamping elements to said second component;
wherein respective third portions of said bands between said first and second portions thereof respectively intersect a major plane of said first component in said joint area, and wherein said third portions of said bands extend through said joint area laterally next to, or between portions of, said pressure element; and
wherein said second portion of each one of said bands extends between a respective one of said clamping elements and said second component and around a side of said respective one of said clamping elements onto a surface of said respective one of said clamping elements facing toward said first component, and wherein said bands and said clamping elements are secured to said second component by said securing elements that respectively pass through said second component, a respective one of said clamping elements, and a respective one of said second portions of said bands at a location between said respective one of said clamping elements and said second component and a location on said surface of said respective one of said clamping elements.

10. The joint arrangement according to claim 9, wherein said pressure element is arranged on one of said clamping elements, with said one of said clamping elements interposed between said pressure element and said second component.

11. The joint arrangement according to claim 9, wherein said third portions of said bands extend through said joint area respectively at positions that are offset one behind another in said longitudinal direction of said first component along said major plane of said first component.

12. The joint arrangement according to claim 9, wherein said bands each respectively comprise at least two plies of one or more materials selected from the group consisting of fiber-reinforced composite materials, synthetic plastic materials, or textile materials.

13. The joint arrangement according to claim 12, wherein said at least two plies are not secured to one another respectively in said third portions of said bands extending through said joint area.

14. The joint arrangement according to claim 9, wherein each one of said bands extends with a longitudinal extension thereof running at an angle not equal to 90 degrees relative to said longitudinal direction of said first component.

15. The joint arrangement according to claim 9, wherein each one of said clamping elements respectively has a hollow space therein so that said respective clamping element is deformable by said securing element in a direction so as to apply a tension to a respective one of said bands that is secured by said respective clamping element.

16. The joint arrangement according to claim 9, wherein said first clamping element extends on said second component on a side of said major plane opposite said first side of said first component, and said second clamping element extends on said second component on a side of said major plane opposite said second side of said first component.

17. The joint arrangement according to claim 9, wherein each one of said bands respectively intersects and crosses over said major plane of said first component only once.

18. The joint arrangement according to claim 9, wherein said first clamping element extends on said second component on a side of said major plane corresponding to said first side of said first component, and said second clamping element extends on said second component on a side of said major plane corresponding to said second side of said first component.

19. The joint arrangement according to claim 9, wherein each one of said bands respectively intersects and crosses over said major plane of said first component exactly twice.

20. The joint arrangement according to claim 9, further comprising a contact element arranged on a side of said pressure element facing toward said first component.

21. The joint arrangement according to claim 20, wherein said contact element comprises a sliding layer.

22. The joint arrangement according to claim 20, wherein said longitudinal edge has a first curved surface facing toward said contact element, said contact element has a second curved surface facing toward and contacting said first curved surface of said longitudinal edge of said first component, and said second curved surface has a larger radius of curvature than said first curved surface.

* * * * *